(12) United States Patent
Lu et al.

(10) Patent No.: US 8,070,311 B2
(45) Date of Patent: Dec. 6, 2011

(54) SOLAR LED LAMP

(75) Inventors: Zhong-Liang Lu, Shenzhen (CN); Yong-Dong Chen, Shenzhen (CN); Shih-Hsun Wung, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 178 days.

(21) Appl. No.: 12/430,853

(22) Filed: Apr. 27, 2009

(65) Prior Publication Data

US 2010/0149792 A1 Jun. 17, 2010

(30) Foreign Application Priority Data

Dec. 12, 2008 (CN) .......................... 2008 1 0306193

(51) Int. Cl.
*H01L 25/00* (2006.01)

(52) U.S. Cl. .................................. 362/183; 362/249.02

(58) Field of Classification Search .................. 362/183, 362/800, 249.02, 249.11
See application file for complete search history.

(56) References Cited

U.S. PATENT DOCUMENTS

| 6,060,658 | A * | 5/2000 | Yoshida et al. | 136/243 |
| 6,522,263 | B2 * | 2/2003 | Jones | 340/915 |
| 6,948,826 | B2 * | 9/2005 | Fogerlie | 362/183 |
| 7,771,087 | B2 * | 8/2010 | Wilcox et al. | 362/294 |
| 2008/0298051 | A1 * | 12/2008 | Chu | 362/183 |

* cited by examiner

*Primary Examiner* — Anabel Ton
(74) *Attorney, Agent, or Firm* — Altis Law Group, Inc.

(57) ABSTRACT

A solar LED lamp for lighting purpose includes a fixing box, a covering member mounted on the fixing box and a plurality of LED modules attached to a bottom of the covering member. The covering member includes a top plate fixed to a top of the fixing box, a solar panel disposed over a top surface of the top plate and a mounting bracket fixed to a bottom of the top plate and located in front of the fixing box. The LED modules are attached to a bottom of the mounting bracket. The solar panel is provided for receiving solar energy and converting the solar energy into electrical energy which is used to activate the LED modules.

15 Claims, 5 Drawing Sheets

SOLAR LED LAMP

BACKGROUND

1. Technical Field

The present invention relates to an LED (light emitting diode) lamp and, more particularly, to a solar LED lamp which utilizes solar energy to drive an LED lamp.

2. Description of Related Art

An LED lamp is a type of solid-state lighting that utilizes LEDs as a source of illumination. An LED is a device for transferring electricity to light by using a theory that, if a current is made to flow in a forward direction through a junction region comprising two different semiconductors, electrons and holes are coupled at the junction region to generate a light beam. The LED has an advantage that it is resistant to shock, and has an almost eternal lifetime under a specific condition; thus, the LED lamp is intended to be a cost-effective yet high quality replacement for incandescent and fluorescent lamps.

Known implementations of LED lamp are electrically powered. However, it is not feasible to use the electrically powered LED lamp in some wild areas such as desert, mountain chains and virgin forest for there being no electrical power supply in such remote areas.

What is needed, therefore, is a solar LED lamp which can overcome the above-mentioned disadvantages.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION

Figure 1:
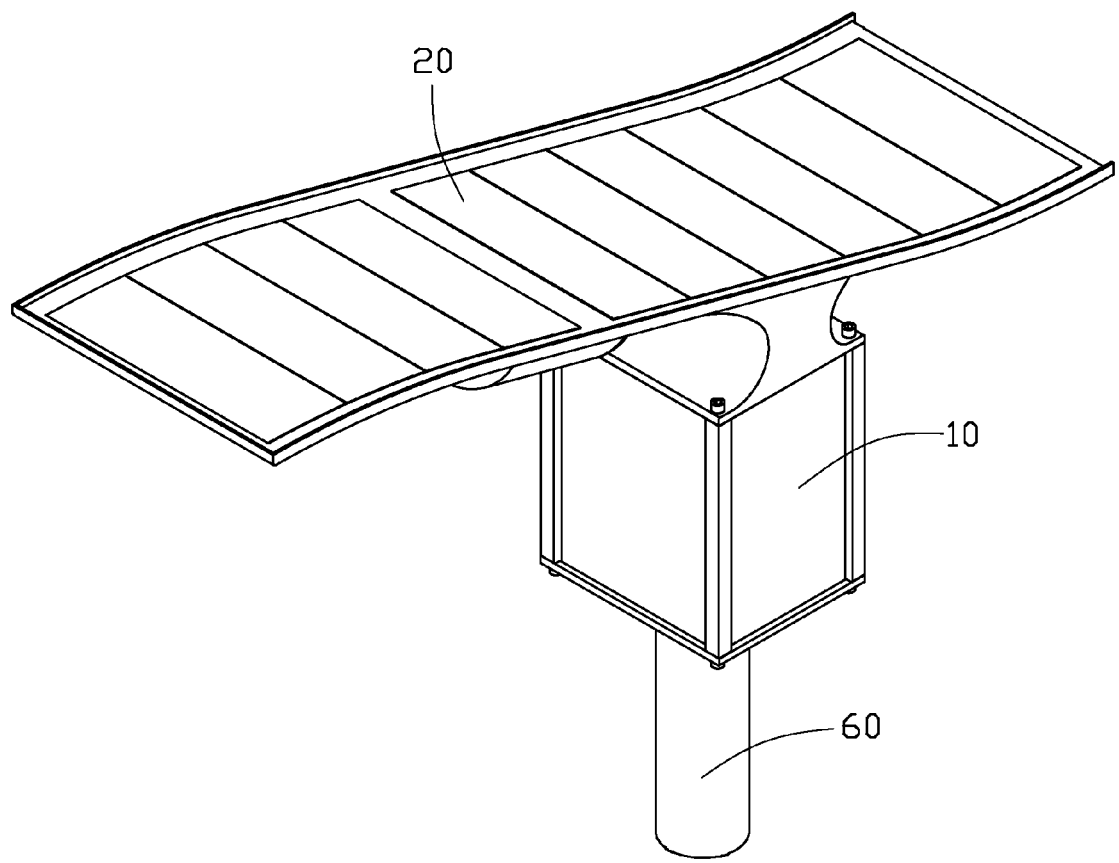
FIG. 1 is an assembled, isometric view of a solar LED lamp in accordance with an embodiment of the present invention.
Figure 2:
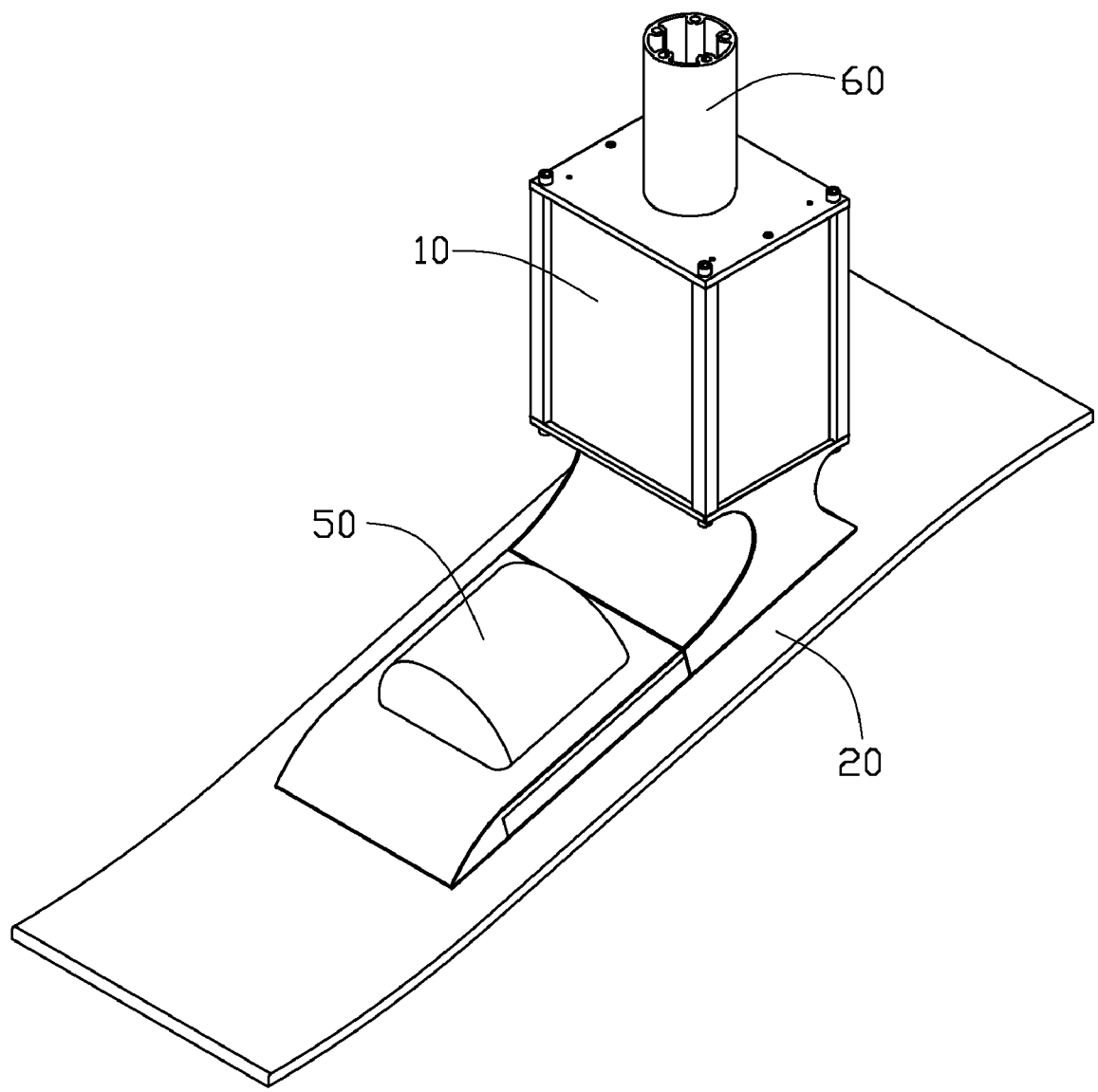
FIG. 2 is an inverted view of the solar LED lamp of FIG. 1.
Figure 3:
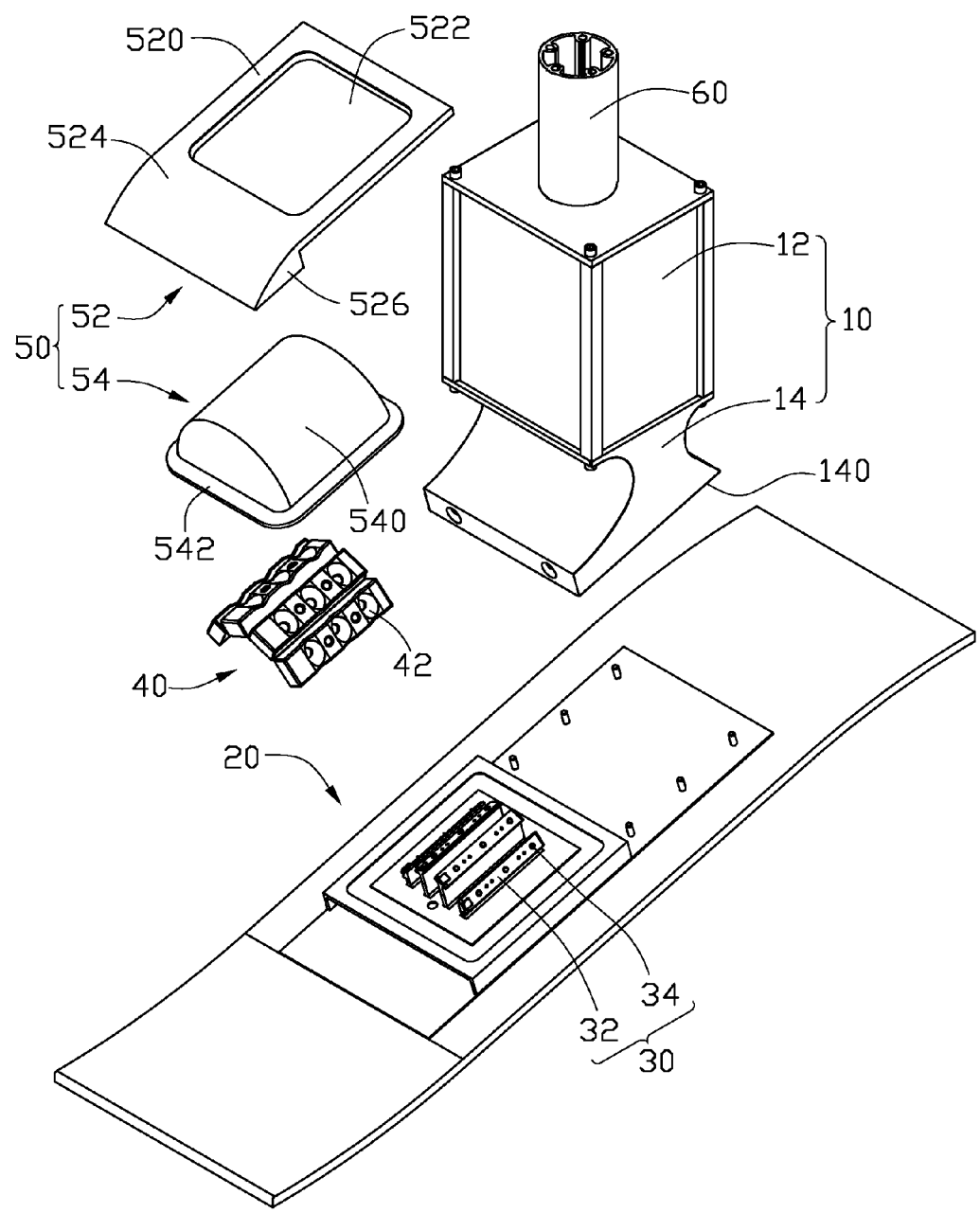
FIG. 3 is an exploded view of FIG. 2.

Referring to FIGS. 1-3, a solar LED lamp is located outdoors for a lighting purpose. The solar LED lamp comprises a fixing box 10, a covering member 20 fixed on a top of the fixing box 10, a plurality of LED modules 30 mounted on a bottom of the covering member 20, a plurality of light-guiding members 40 respectively fixed to the LED modules 30, a housing 50 engaging with the bottom of the covering member 20 to enclose the LED modules 30 and the light-guiding members 40 therein and a retaining pole 60 fixed to a bottom of the fixing box 10 to fix the solar LED lamp in place.

Figure 4:
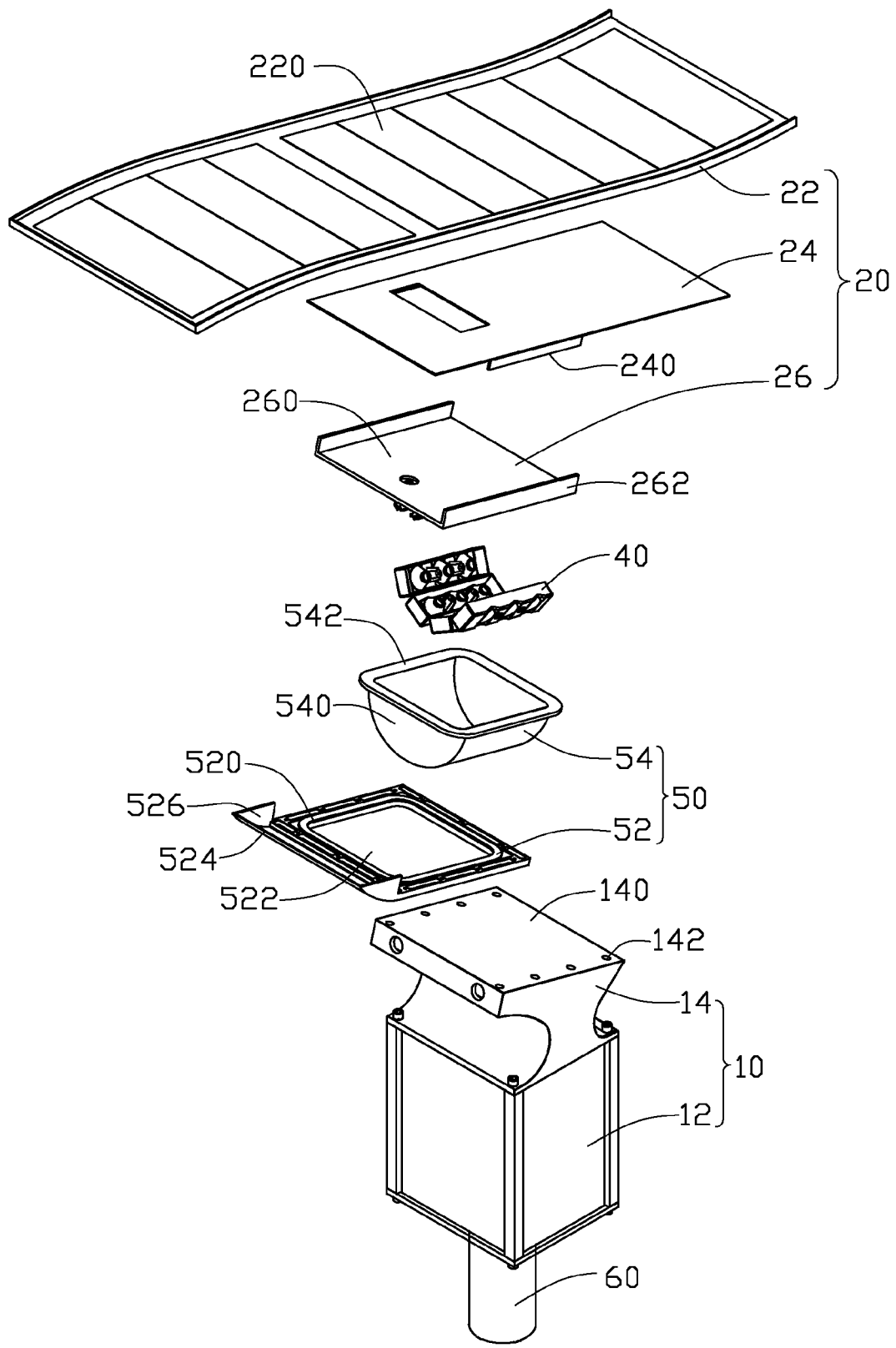
FIG. 4 is an exploded view of FIG. 1.
Figure 5:
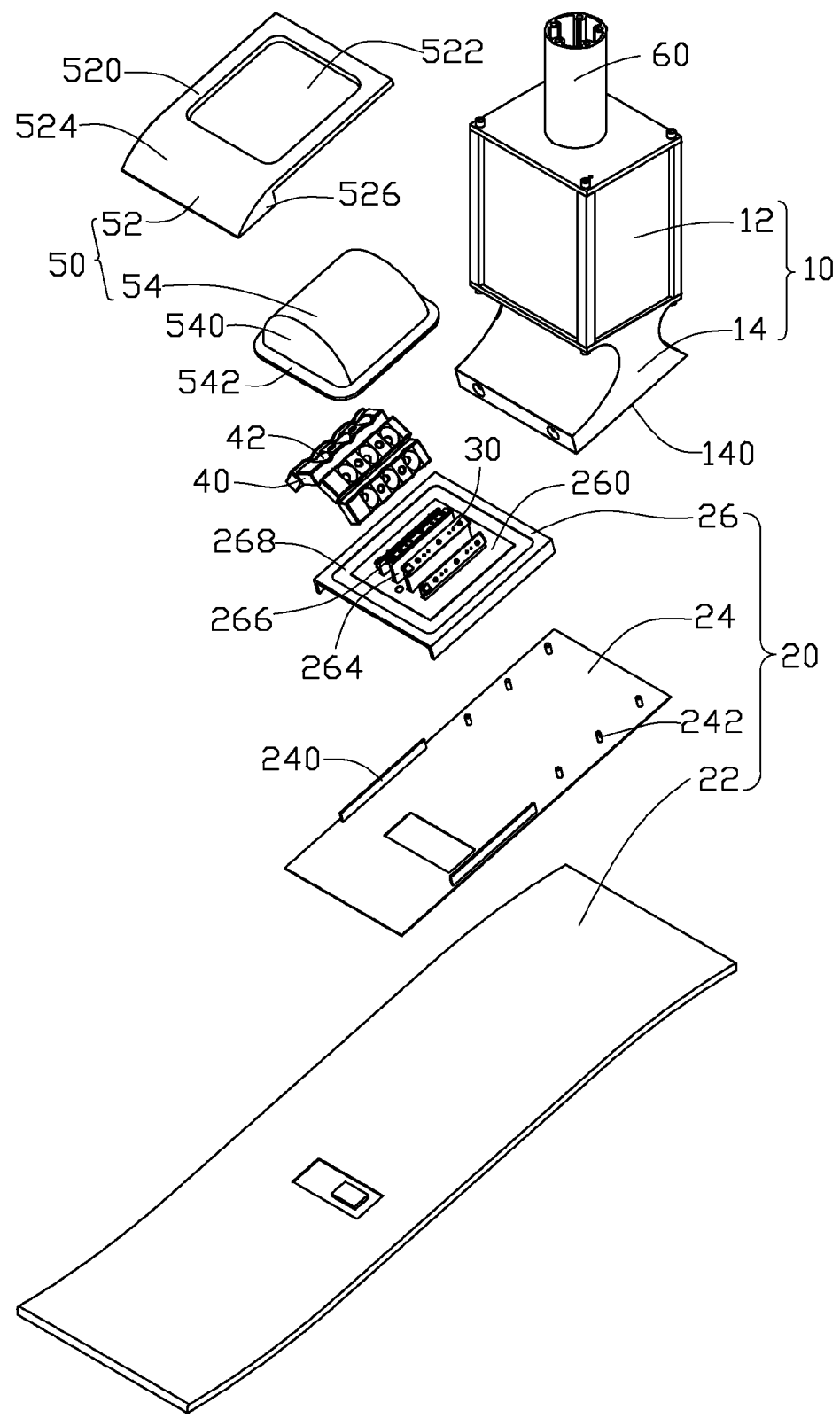
FIG. 5 is a further exploded view of FIG. 2.

Also referring to FIGS. 4 and 5, the fixing box 10 comprises a receiving box 12 with a cube configuration and a connecting part 14 extending upwardly from a top of the receiving box 12. The receiving box 12 is designed for receiving a rechargeable battery and other related electronic components therein, for providing the LED modules 30 with electrical power which is obtained by converting solar energy into electrical energy. The connecting part 14 has an inclined top surface 140 with a level lowering continuously from a front toward a rear thereof, and opposite curve-shaped front and rear sides. A plurality of fixing holes 142 are defined in the inclined top surface 140 of the connecting part 14 and arranged into two rows respectively adjacent to two opposite lateral sides of the inclined top surface 140, for fixing the covering member 20 on the inclined top surface of the fixing box 10.

The covering member 20 is fixed on the inclined top surface 140 of the fixing box 10, to thereby make a front part thereof to tilt upwardly. The covering member 20 comprises a top plate 22, a connecting plate 24 attached to a bottom surface of the top plate 22 and a mounting bracket 26 fixed to a font part of a bottom of the connecting plate 24.

The top plate 22 is substantially rectangular and curves slightly for an aesthetic purpose. A solar panel 220 is disposed over a top surface of the top pate 22 and used to convert the solar energy into the electrical energy. The electrical energy is then stored in the rechargeable battery which is electrically connected to the solar panels 220 and also connected to the LED modules 30 through a switch (not shown). In order to maximize a surface area of the solar panel 220 to catch sunshine as much as possible, the top plate 22 is designed to be much larger than the connecting pate 22 in size.

The connecting plate 24 is rectangular and attached to a middle portion of the bottom surface of the top plate 22. The connecting plate 24 has two connecting flanges 240 extending downwardly and perpendicularly from two opposite lateral side edges thereof. The connecting flanges 240 are located adjacent to a front edge of the connecting plate 24 and engage with the mounting brackets 26. A plurality of fixing posts 242 extend downwardly and perpendicularly from a bottom surface of the connecting plate 24 and arranged in two rows respectively adjacent to two opposite lateral side edges of the connecting plate 24. The fixing posts 242 are located at a rear portion of the connecting plate 24 and inserted into the corresponding fixing holes 142 in the inclined top surface 140 of the fixing box 10 to fix the covering member 20 onto the fixing box 10, whereby the connecting flanges 240 are located in front of the fixing box 10.

The mounting bracket 26 engages the connecting flanges 240 of the connecting plate 24 and locates in front of the fixing box 10. The mounting bracket 26 comprises a mounting plate 260, two engaging flanges 262 extending upwardly from two opposite lateral sides of the mounting plate 260, a plurality of parallel vertical sheets 264 extending downwardly from a bottom surface of the mounting plate 260 and a plurality of elongated fixing sheets 266 respectively connected to bottom ends of the vertical sheets 264. The mounting plate 260 is equal to the mounting plate 24 in width and has a length less than half of a length of the connecting plate 24. The mounting plate 260 located under the connecting plate 24 is rectangular, parallel to and separated from the mounting plate 24. An annular receiving groove 268 is defined in the bottom surface of the mounting plate 260 around a periphery edge of the mounting plate 260. The annular receiving groove 268 surrounds the LED modules 30 for engagingly receiving an annular retaining flange 542 of the housing 50.

The engaging flanges 262 are similar to the connecting flanges 240 of the connecting pate 24 in height and perpendicular to the mounting plate 260. Two inner surfaces of the engaging flanges 262 are respectively attached to two outer surfaces of the two connecting flanges 240 of the connecting plate 24 to thus couple the mounting bracket 26 to a front portion of the bottom of the connecting plate 24.

The vertical sheets 264 are spaced from each other and parallel to the engaging flanges 262 and the two opposite sides of the mounting plate 260. The vertical sheets 264 at a middle are higher than those at two lateral sides. The fixing sheets 266 are divided into two groups each facing to a neighboring lateral side of the mounting bracket 26. Each fixing sheet is arranged at an acute angle to the mounting plate 260 and the fixing sheets 266 are symmetrical relative to a midline of the mounting plate 26, to thus enlarge an illuminating area of the LED modules 30 respectively attached to inclined bottom surfaces of the fixing sheets 266.

Each LED module 30 comprises an elongated printed circuit board 32 and a plurality of spaced LEDs 34 evenly mounted on a bottom side of the printed circuit board 32. A top side of each printed circuit board 32 is attached to the inclined bottom surface of a corresponding fixing sheet 266 of the mounting bracket 26. The LEDs 34 of each LED module 30 are arranged along a longitudinal axis of the printed circuit board 32.

Each light-guiding module 40 is fixed to a bottom of a corresponding LED module 30 to guide the light generated by the LEDs 34 thereof in a predetermined manner. Each light-guiding module 40 comprises a plurality of guiding units 42 which are arranged along a longitudinal axis of the light-guiding module 40 and respectively in alignment with the LEDs 34.

The housing 50 comprises a lens 54 and a retaining frame 52 securing the lens 54 onto the bottom surface of the mounting plate 260 of the mounting bracket 26. The lens 54 comprises the annular retaining flange 542 and a covering part 540 projecting downwardly from an inner edge of the retaining flange 542. The retaining frame 52 comprises a frame part 520 having a configuration of a hollow rectangle, a front plate 524 curving upwardly from a front edge of the frame part 520 and two side plates 526 extending vertically and upwardly from two opposite lateral sides of the front plate 524. A rectangular through hole 522 is defined in central part of the frame part 520 for the covering part 540 of the lens 54 to extend therethrough. Upper edges of the front plate 524 and the two side plates 526 are rested on the bottom surface of the connecting plate 24 at a position in front of the mounting bracket 26.

In assembly of the solar LED lamp, the covering member 20 is fixed on the top of the fixing box 10 with the mounting bracket 26 located in front of the fixing box 10 and tilting upwardly. The LED modules 30 combined with the corresponding light-guiding modules 40 are fixed to the fixing sheets 266 of the mounting bracket 26. The annular retaining flange 542 is received in the annular receiving groove 268 in the bottom surface of the mounting bracket 26 and sandwiched between the frame part 520 of the retaining frame 52 and the mounting plate 260 of the mounting bracket 26. The covering part 540 encloses the LED modules 30 and the light-guiding modules 40 therein and extends downwardly through the through hole 522 of the retaining frame 52.

In use, the solar panels 220 located on the top of the covering member 20 of the solar LED lamp are directly exposed to sunshine and used to convert the solar energy into the electrical energy. The electrical energy is then stored in the rechargeable battery which is electrically connected to the solar panel 220 and also connected to the LED modules 30 through the switch (not shown). The solar LED lamp can be equipped with a light sensor which can detect a brightness of an environment of the solar LED lamp. When the environment is dark enough, the sensor sends a signal to the switch to turn the switch on. The switch then electrically connects the rechargeable battery and the solar LED lamp, thereby enabling the electric power stored in the storage battery to be provided to the solar LED lamp.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A solar LED lamp for lighting purpose comprising:
    a fixing box having a retaining pole extending therefrom for fixing the solar LED lamp to a selected position;
    a covering member comprising a top plate fixed to a top of the fixing box, a solar panel disposed over a top surface of the top plate and a mounting bracket fixed to a bottom of the top plate and located in front of the fixing box; and
    a plurality of LED modules attached to a bottom of the mounting bracket;
    wherein the solar panel is adapted for receiving solar energy and converting the solar energy into electrical energy which is used to activate the LED modules.

2. The solar LED lamp of claim 1, wherein the mounting bracket comprises a mounting plate separated from the top plate and two engaging flanges extending upwardly toward the top plate to connect with the top plate.

3. The solar LED lamp of claim 2, wherein the covering member further comprises a connecting plate which is attached to the bottom of the top plate and connected with the engaging flanges of the bracket.

4. The solar LED lamp of claim 3, wherein two connecting flanges are extended downwardly toward the mounting bracket from two opposite lateral edges of a front part of the connecting plate and respectively engage with two inner sides of the engaging flanges of the mounting bracket to thus couple the connecting plate and the mounting bracket together.

5. The solar LED lamp of claim 4, wherein a plurality of spaced fixing posts extend downwardly from a bottom surface of a rear part of the connecting plate and are inserted into the top of the fixing box to fix the covering member onto the fixing box.

6. The solar LED lamp of claim 2, wherein the mounting bracket comprises a plurality of parallel vertical sheets extending downwardly from a bottom surface of the mounting plate and a plurality of elongated fixing sheets respectively formed at bottom ends of the vertical sheets.

7. The solar LED lamp of claim 6, wherein each the fixing sheet has an inclined bottom surface on which a corresponding one of the LED modules is attached.

8. The solar LED lamp of claim 7, wherein the fixing sheets are divided into two groups each facing a neighboring one of two lateral sides of the mounting plate of the mounting bracket, each of the fixing sheets arranged at an acute angle to the mounting plate, the fixing sheets being symmetrical relative to a midline of the mounting plate of the mounting bracket.

9. The solar LED lamp of claim 8, wherein the vertical sheets are parallel to the two engaging flanges of the mounting bracket and have heights decreasing from the midline toward the two lateral sides of the mounting plate of the mounting bracket.

10. The solar LED lamp of claim 1, wherein the fixing box comprises a receiving box and a connecting part at a top of the receiving box, the covering member engaging with a top of the connecting part, the connecting part having curve-shaped front and rear sides.

11. The solar LED lamp of claim 10, wherein the connecting part has an inclined top surface with a level lowering continuously from a front toward a rear thereof, the covering member being disposed on the inclined top surface with a front end of the covering member tilting upwardly.

12. The solar LED lamp of claim 1, further comprising a plurality of light-guiding member, each light-guiding module mounted to a corresponding LED module and comprising a plurality of guiding units respectively in alignment with a plurality of LEDs mounted on the LED module.

13. The solar LED lamp of claim 12, further comprising a housing engaging with a bottom of the mounting bracket to enclose the LED modules and the light-guiding modules therein.

14. The solar LED lamp of claim 13, wherein the housing comprises a lens and a retaining frame, the lens having an annular retaining flange and a covering part projecting downwardly from an inner edge of the retaining flange, the retaining frame having a frame part with a through hole in a central part thereof and a front plate curving upwardly from a front edge of the frame part and rested on the bottom of the top plate of the covering member.

15. The solar LED lamp of claim 14, wherein the annular retaining flange is received in an annular receiving groove defined in a bottom surface of the mounting bracket and sandwiched between the frame part of the retaining frame and the mounting bracket, the covering part enclosing the LED modules and the light-guiding modules therein and extending downwardly through the through hole of the frame part of the retaining frame.

* * * * *